(12) United States Patent
Watanabe et al.

(10) Patent No.: US 9,199,848 B2
(45) Date of Patent: Dec. 1, 2015

(54) PROCESS FOR PRODUCING SPHERICAL ALUMINUM NITRIDE POWDER AND SPHERICAL ALUMINUM NITRIDE POWDER PRODUCED BY THE SAME PROCESS

(75) Inventors: Kazutaka Watanabe, Shunan (JP); Takehiko Yoneda, Shunan (JP)

(73) Assignee: TOKUYAMA CORPORATION, Shunan-shi (JP)

( * ) Notice: Subject to any disclaimer, the term of this patent is extended or adjusted under 35 U.S.C. 154(b) by 166 days.

(21) Appl. No.: 13/516,268

(22) PCT Filed: Jan. 31, 2011

(86) PCT No.: PCT/JP2011/051886
§ 371 (c)(1),
(2), (4) Date: Jun. 15, 2012

(87) PCT Pub. No.: WO2011/093488
PCT Pub. Date: Aug. 4, 2011

(65) Prior Publication Data
US 2012/0258310 A1 Oct. 11, 2012

(30) Foreign Application Priority Data

Jan. 29, 2010 (JP) ................................ 2010-018515
Mar. 31, 2010 (JP) ................................ 2010-083459

(51) Int. Cl.
*B32B 5/16* (2006.01)
*C01B 21/072* (2006.01)

(52) U.S. Cl.
CPC ........... *C01B 21/072* (2013.01); *C01B 21/0726* (2013.01); *C01P 2004/03* (2013.01); *C01P 2004/32* (2013.01); *C01P 2004/61* (2013.01); *C01P 2006/12* (2013.01); *C01P 2006/14* (2013.01); *C01P 2006/16* (2013.01); *C01P 2006/21* (2013.01); *C01P 2006/32* (2013.01); *Y10T 428/2982* (2015.01)

(58) Field of Classification Search
CPC .............. C01B 21/072; C01B 21/0726; Y10T 428/2982
USPC ............................ 428/402; 501/96.1; 423/412
See application file for complete search history.

(56) References Cited

U.S. PATENT DOCUMENTS

| 2002/0047110 | A1 | 4/2002 | Takao et al. |
| 2005/0173094 | A1 | 8/2005 | Mori |
| 2007/0184966 | A1 | 8/2007 | Gotoh et al. |
| 2013/0164534 | A1* | 6/2013 | Muneoka et al. ............. 428/402 |
| 2013/0171451 | A1* | 7/2013 | Muneoka et al. ............. 428/402 |
| 2013/0244036 | A1* | 9/2013 | Muneoka et al. ............. 428/402 |

FOREIGN PATENT DOCUMENTS

| CN | 1938221 | A | | 3/2007 |
| EP | 0271353 | | * | 12/1987 |
| EP | 0271353 | A2 | | 6/1988 |
| JP | 62-207703 | A | | 9/1987 |
| JP | 1-119573 | A | | 5/1989 |
| JP | 3-23206 | A | | 1/1991 |
| JP | 4-74705 | A | | 3/1992 |
| JP | H0474705 | | * | 3/1992 |
| JP | 9-52704 | A | | 2/1997 |
| JP | 11-269302 | A | | 10/1999 |
| JP | 2002-97006 | A | | 4/2002 |
| JP | 2002097006 | | * | 4/2002 |
| JP | 2002-179413 | | * | 6/2002 |
| JP | 2002-179413 | A | | 6/2002 |
| JP | 2005-162555 | A | | 6/2005 |
| JP | 2005162555 | | * | 6/2005 |
| WO | WO 03/097527 | A1 | | 11/2003 |

OTHER PUBLICATIONS

International Search Report issued in PCT/JP2011/051886, mailed on Apr. 19, 2011.
Chinese Office Action issued on Jan. 6, 2014 in corresponding Chinese Patent Application No. 201180005141.7.
T. Suehiro et al.; Morphology-retaining synthesis of AlN particles by gas reduction-nitridation; Materials Letters; No. 57; 2002; pp. 910-913.
Extended European Search Report dated May 8, 2014, issued in corresponding European Patent Application No. 11737197.1.
Japanese Office Action dated Sep. 2, 2014, issued in corresponding Japanese Patent Application No. 2011-551953.
Fujiwara et al., "Development of New High-Purity Alumina," R&D Report, Sumitomo Kagaku, vol. 2007-I, 2007, pp. 1-10.
Taiwanese Office Action and Search Report, dated Nov. 27, 2014, for Taiwanese Application No. 100103543.

* cited by examiner

*Primary Examiner* — Leszek Kiliman
(74) *Attorney, Agent, or Firm* — Birch, Stewart, Kolasch & Birch, LLP

(57) ABSTRACT

To provide a process capable of efficiently producing a spherical aluminum nitride powder having a size most suited for use as a filler, and having a high sphericalness and a large particle strength.

A spherical aluminum nitride powder is produced by using a spherical granulated product of an alumina powder or an alumina hydrate powder as a starting material, and feeding the spherical granulated product to the step of reductive nitrogenation so as to be reductively nitrogenated.

4 Claims, 7 Drawing Sheets

PROCESS FOR PRODUCING SPHERICAL ALUMINUM NITRIDE POWDER AND SPHERICAL ALUMINUM NITRIDE POWDER PRODUCED BY THE SAME PROCESS

TECHNICAL FIELD

This invention relates to a novel process for producing an aluminum nitride powder having properties suited as a filler for use in a heat-radiating sheet, heat-radiating grease, adhesive and coating material, and to a spherical aluminum nitride powder produced by the same process.

BACKGROUND ART

Heat-radiating materials comprising a silicone rubber or a silicone grease filled with a filler such as of alumina or boron nitride have been widely used as heat-radiating sheets or heat-radiating greases in a variety of kinds of electronic devices. The aluminum nitride excels in electrically insulating property, has a high heat conducting property, and is drawing attention as a filler for use in the heat-radiating materials.

In order to improve the heat conductivity of the heat-radiating material, it is important that a filler having a high heat conducting property is densely filled. When the aluminum nitride powder is used as a filler for the heat-radiating material, therefore, it is required that the particles forming the powder are spherical and have particle sizes of as wide as from about several tens of μm to several hundreds of μm. That is, in order for the filler to be densely filled in a medium such as a resin without impairing the formability (fluidity), it is most desired to use a powder that includes spherical particles of relatively large particle sizes as well as spherical particles of relatively small particle sizes so as to form a filled structure in which small spherical particles are distributed among large spherical particles.

As processes for producing the aluminum nitride, there have been known a process for reductively nitrogenating alumina, a direct nitrogenation process and a gas phase process.

The process for reductively nitrogenating alumina is a process in which a mixture of alumina and carbon is heated in nitrogen to reduce the alumina which is then nitrogenated to obtain the aluminum nitride.

The direct nitrogenation process is a process in which aluminum is reacted with nitrogen to obtain the aluminum nitride directly from the aluminum.

The gas phase process is a process in which an alkylaluminum is reacted with ammonia followed by heating to obtain the aluminum nitride.

According to the above processes for producing the aluminum nitride, however, it is difficult to obtain a powder of aluminum nitride that can be advantageously and densely filled in a medium such as a resin.

According to the reductive nitrogenation process and the gas phase process, for example, the powder of the obtained aluminum nitride comprises particles of nearly a spherical shape, the particle sizes, however, being mostly of the order of sub-microns.

According to the direct nitrogenation process, the aluminum nitride is obtained in a massive form and is pulverized and classified into particles of predetermined sizes. Therefore, the particle size can be controlled relatively easily. However, the particles assume cornered shapes which are far from the spherical shape.

Thus, there have been proposed aluminum nitride powders comprising particles having various shapes and sizes as well as processes for producing the powders, all of which having advantages and disadvantages. However, there has not yet been proposed any aluminum nitride powder having the above-mentioned particle properties and that can be densely filled in a medium such as a resin.

For example, a patent document 1 is disclosing an aluminum nitride powder comprising particles having a monotonous particle size of an average particle size of not less than 3 μm and having a round shape. However, the particles in the aluminum nitride powder do not have large particle sizes of not smaller than 10 μm.

Further, patent documents 2 and 3 are disclosing processes for producing an alumina nitride powder by reductively nitrogenating spherical alumina or hydrated alumina with a nitrogen gas or an ammonia gas in the presence of carbon. According to these processes, there can be obtained an aluminum nitride powder comprising particles of nearly a spherical shape and having relatively large particle sizes as well as an aluminum nitride powder having small particle sizes. According to the processes disclosed in these patent documents, however, the obtained spherical aluminum nitride powder tends to become hollow and, therefore, has a small particle strength and cannot stably maintain the particle size. That is, when added into the resin, the particles collapse into a fine powder and, therefore, deteriorate the formability (fluidity) of the resin. Besides, the particles are easily powdered deteriorating workability.

Further, a patent document 4 discloses the production of a spherical aluminum nitride powder by adding a forming assistant to an AlN powder produced by a predetermined method, wet-pulverizing the mixture thereof, granulating the pulverized mixture by using a spray drier, mixing a BN powder into the obtained granulated product (granules), and firing and sintering the mixture at a high temperature in a nitrogen atmosphere. According to this process, however, the firing is necessary for sintering the obtained particles in addition to the firing for nitrogenating the aluminum; i.e., the firing must be conducted twice at high temperatures. Besides, a step is necessary for pulverizing the aluminum nitride powder that is once produced. Therefore, the cost of production becomes too high, and it is difficult to carry out the process on an industrial scale.

Further, the aluminum nitride powder according to this process is obtained through the sintering. Namely, the particles are bonded together and are subject to be deformed due to the sintering. Further, though the strength against the crushing increases due to the growth of the aluminum nitride crystal particles, the particles tend to be easily dented or protruded to a large extent. Therefore, the obtained aluminum nitride powder has a small specific surface area, adheres less closely to the resin into which it is introduced, and the obtained heat-radiating material possesses insufficient strength.

A patent document 5 discloses a process for obtaining a crystalline aluminum nitride powder by maturing (heat-treating) an aluminum nitride powder of amorphous particles in a flux of a compound of an alkaline earth element or a rare earth element so as to assume a spherical shape, and dissolving the flux to obtain the crystalline aluminum nitride powder that is isolated. This process makes it possible to obtain the aluminum nitride powder of a shape and particle size suited for being highly densely filled. However, the aluminum nitride powder that is once produced must be, further, subjected to a special treatment casting a problem from the standpoint of production cost. Besides, the aluminum nitride powder obtained by this process contains impurities in large amounts due to the use of a flux agent.

PRIOR ART DOCUMENTS

Patent document 1: JP-A-3-23206
Patent document 2: JP-A-4-74705
Patent document 3: JP-A-2005-162555
Patent document 4: JP-A-11-269302
Patent document 5: JP-A-2002-179413

OUTLINE OF THE INVENTION

Problems that the Invention is to Solve

It is, therefore, an object of the present invention to provide a process capable of efficiently producing a spherical aluminum nitride powder having a size most suited for use as a filler, and having a high sphericalness and a large particle strength, as well as a spherical aluminum nitride powder obtained by the above process.

Means for Solving the Problems

The present inventors have conducted a keen study in an attempt to solve the above problems, have discovered that an aluminum nitride powder comprising spherical particles having desired properties can be produced maintaining good productivity by using, as a starting material, a spherical granulated product that is once obtained by granulating an alumina powder or an alumina hydrate powder, and reductively nitrogenating the spherical granulated product, and have completed the present invention.

Namely, according to the present invention, there is provided a process for producing a spherical aluminum nitride powder by using a spherical granulated product of an alumina powder or an alumina hydrate powder as a starting material, and feeding the spherical granulated product to the step of reductive nitrogenation so as to be reductively nitrogenated.

The process for production of the invention can, further, include the step of heat treatment for once heat-treating the spherical granulated product to such a degree that a BET specific surface area thereof is maintained to be at least not less than 2 $m^2/g$ prior to feeding the spherical granulated product to the step of reductive nitrogenation.

It is, further, desired that the spherical granulated product is, usually, the one obtained by spray-drying the above powder, and, in this case, has a BET specific surface area in a range of 30 to 500 $m^2/g$ and, specifically, 50 to 300 $m^2/g$.

It is, further, desired that in the step of reductive nitrogenation, the spherical granulated product or the heat-treated product thereof is reductively nitrogenated in a nitrogen atmosphere in the presence of a reducing agent at a temperature of 1200 to 1800° C.

According to the above process for production, there is obtained a spherical aluminum nitride powder comprising a particles having a sphericalness of not less than 0.8 on the average and a strength against the crushing of not less than 100 MPa, the spherical aluminum nitride powder having an average particle size ($D_{50}$) in a range of 10 to 200 μm and a BET specific surface area in a range of 0.5 to 20 $m^2/g$.

In the invention, it is desired that the spherical aluminum nitride powder has the volume of pores of pore diameters of not more than 2 μm in a range of 0.02 to 1.0 $cm^3/g$.

The spherical aluminum nitride powder is preferably used as a filler for heat-radiating materials.

In the specification, the granulated product (granule) has a solid, round and fine particulate shape formed by utilizing the coagulating property and adhesive property of the fine powder.

In the specification, further, the average particle size, sphericalness, BET specific surface area and average strength against the crushing of the spherical aluminum nitride powder are the values measured according to the methods described in Examples appearing later.

Effects of the Invention

The process for production of the invention uses, as a starting material, a granulated product of alumina or alumina hydrate having a predetermined specific surface area, and converts the granulated product into the aluminum nitride through the reductive nitrogenation. It is, therefore, made possible to efficiently produce a spherical aluminum nitride powder having relatively large particle sizes most suited for use as a filler through a simple process maintaining a high conversion.

According to the above process, for example, there is provided a spherical aluminum nitride powder comprising particles having a sphericalness of as high as 0.8 or more, an average particle size in a range of as relatively large as 10 to 200 μm and a BET specific surface area of 0.5 to 20 $m^2/g$. Namely, the aluminum nitride powder comprises particles of sizes over a wide range from relatively large average particle sizes down to small particle sizes. Therefore, the aluminum nitride powder can be highly densely filled as a filler in a variety of media without impairing the formability (fluidity).

Besides, the particles of the aluminum nitride powder are solid as will be understood from an SEM photograph of FIG. 1, etc. and have an average strength against the crushing of as very large as 100 MPa or more. With this aluminum nitride powder, therefore, the particles are effectively prevented from being collapsed, the shapes and sizes of the particles are stably maintained, a drop in the filling ratio due to collapsed particles is effectively avoided and, besides, the particles are not powdered.

Moreover, since no metal additive such as flux agent is used, the aluminum nitride powder features a very high purity.

MODES FOR CARRYING OUT THE INVENTION

<Production of Spherical Aluminum Nitride Powders>

Figure 1:
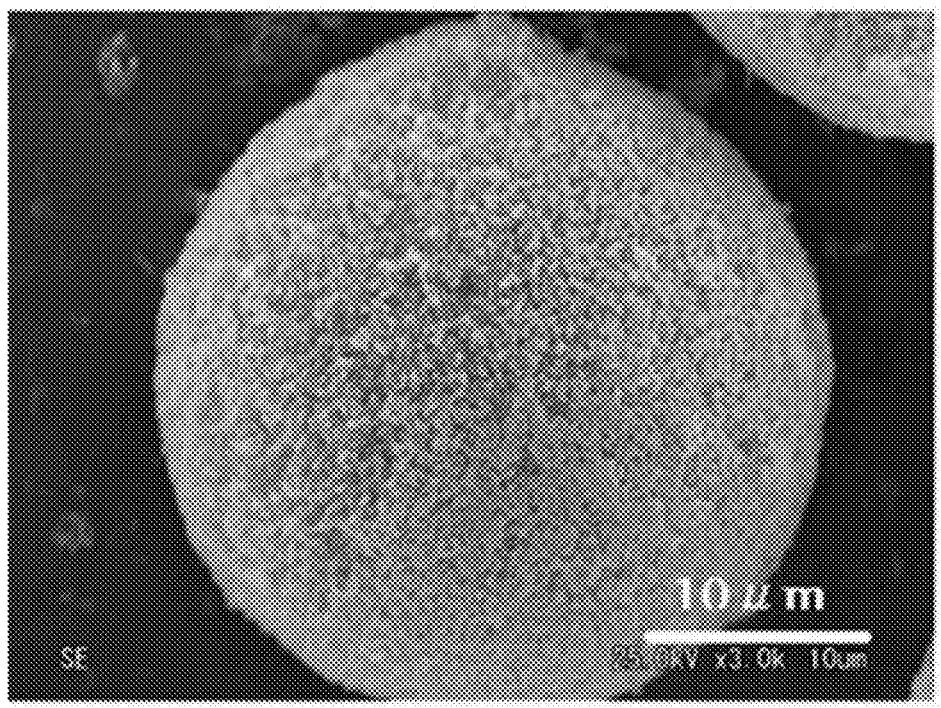
FIG. 1 is an SEM photograph showing a particle structure in a representative spherical aluminum nitride powder of the invention.

The process for production of the invention uses a spherical granulated product of spherical alumina or alumina hydrate as a starting material, feeds the granulated product (or a heat-treated product thereof) to the step of reductive nitrogenation so as to be reductively nitrogenated finally followed by an after-treatment such as a surface oxidation treatment to obtain a desired spherical aluminum nitride powder.

1. Starting Materials:

The granulated product (granules) of spherical alumina or alumina hydrate used as a starting material is obtained by granulating an alumina powder or an alumina hydrate powder into a spherical form.

To obtain the granulated product, any alumina can be used without limitation if it has a crystal structure such as of $\alpha$, $\gamma$, $\phi$, $\eta$ or $\delta$. Through the heat-treatment, further, the alumina hydrate changes into a transition alumina such as of $\gamma$, $\phi$, $\eta$ or $\delta$ or, further, into an $\alpha$-alumina. As such alumina hydrate, there can be exemplified boehmite, diaspore and aluminum hydroxide.

The alumina and alumina hydrate can be produced by, for example, an alkoxide process, Bayer's process, ammonium alum thermal decomposition process or ammonium dawsonite thermal decomposition process. Specifically, the alkoxide process makes it possible to obtain the alumina and alumina hydrate having a high purity and a uniform particle size distribution.

The present invention, therefore, preferably uses, as the starting material, an aluminum hydroxide that is obtained by refining and hydrolyzing the aluminum alkoxide obtained by the alkoxide process, or preferably uses boehmite, transition alumina or $\alpha$-alumina obtained by heat-treating the aluminum hydroxide. When the $\alpha$-alumina, $\gamma$-alumina or boehmite is used as the starting material, in particular, an advantage is obtained in that the reductive nitrogenation reaction can be easily controlled and the nitrogenation proceeds easily.

The starting material used in the present invention is the spherical granulated product of the alumina powder or the alumina hydrate powder and has a large specific surface area. Upon conducting the reductive nitrogenation, the nitrogen gas permeates into the interior of the granulated product through the gaps formed among the particles; i.e., the reductive nitrogenation proceeds. Accordingly, there is obtained a spherical aluminum nitride powder having a spherical shape nearly the same as that of the granulated product, and comprising solid particles.

In the invention, it is desired that the spherical granulated product used as the starting material has a BET specific surface area that is set to lie in a range of 30 to 500 $m^2/g$ and, specifically, 50 to 300 $m^2/g$ by adjusting the granulating conditions.

That is, while elevating the temperature in the step of reductive nitrogenation conducted at a high temperature as will be described later, the specific surface area of the spherical granulated product decreases as the particles thereof are sintered, and the gaps become narrow among the particles. As will be described later, further, the strength of the particles increases. Therefore, the spherical granulated product is often suitably heat-treated prior to being reductively nitrogenated. In the step of heat treatment, too, the specific surface area decreases and the gaps become narrow among the particles. Therefore, if the BET specific surface area of the spherical granulated product becomes too small, the gaps are closed among the particles while the temperature is elevated in the step of reductive nitrogenation or in the step of heat treatment that is suitably conducted, and the reductive nitrogenation is not fully effected up to the interior of the spherical granulated product. To prevent such an inconvenience, the BET specific surface area of the spherical granulated product is set to be not less than 30 $m^2/g$ and, specifically, not less than 50 $m^2/g$. This makes it possible to maintain the BET specific surface area of the spherical granulated product to be not less than 2 $m^2/g$ during, for example, the reductive nitrogenation reaction conducted at a high temperature and to effectively prevent the gaps among the particles from being closed.

If the BET specific surface area of the spherical granulated product becomes too large, coagulation becomes strong among the primary particles, the nitrogen gas diffuses less into the granulated product, nitrogenation becomes slow in the step of reductive nitrogenation, and the conversion into the aluminum nitride drops greatly. Therefore, the BET specific surface area of the spherical granulated product is desirably in a range of not more than 500 $m^2/g$ and, specifically, not more than 300 $m^2/g$.

In the invention, it is desired that the sphericalness of the spherical granulated product is nearly the same as the sphericalness of the particles of the aluminum nitride powder. For instance, it is desired that the ratio (DS/DL) of the short diameter (DS) and the long diameter (DL) thereof is not less than 0.8 as measured from an electron microphotograph.

The above spherical granulated product can be obtained by a variety of methods but is preferably obtained by a spray-drying method from the standpoint of easily controlling the particle size of the granulated product and obtaining the granulated product having a high degree of sphericalness economically and easily. According to this method, a solution obtained by dispersing a fine powder of the above alumina or alumina hydrate in a predetermined solvent (e.g., alcohol or water) is dried (granulated) by being sprayed. Here, the particle size and the BET specific surface area of the granulated product can be adjusted by adjusting the concentration of the solid component in the spray solution.

Further, the spraying method may representatively be of the nozzle type or the disk type, and any one of them can be employed. Use of a spray-drier of the nozzle type, however, brings about such an advantage that the particle size and the BET specific surface area of the obtained granulated product can also be controlled even by controlling the size of the spray-nozzle.

There is no limitation on the spray-drying conditions which, therefore, may be suitably selected depending on the size and type of the spray-drier that is used, concentration of the solid component in the spray solution, viscosity and flow rate thereof.

As required, further, the spherical granulated product may be blended with a dispersing agent, a binder resin, a lubricant, or with an alkaline earth metal compound aimed at firing the aluminum nitride at a low temperature, a rare earth element compound, a combination thereof, a fluoride of an alkaline earth metal or a composite compound containing an alkaline earth element.

2. Heat-Treated Products of the Starting Materials.

In the invention, the spherical granulated product of the alumina powder or the alumina hydrate powder can be directly fed to the step of reductive nitrogenation that will be described below so as to be reductively nitrogenated, or the spherical granulated product can be fed to the step of heat treatment where it is once heat-treated and is, thereafter, fed to the step of reductive nitrogenation.

In the step of reductive nitrogenation, the spherical granulated product which is the starting material is held at a high temperature of not lower than 1200° C. Upon being heated in the step of elevating the temperature, therefore, the spherical granulated product contracts, the particle size varies, the BET specific surface area decreases and, thereafter, the reductive nitrogenation is conducted. It is, therefore, also allowable to once cool the spherical granulated product and, thereafter, feed it to the step of reductive nitrogenation. For example, the step of reductive nitrogenation can be fed with the spherical granulated product of γ-alumina obtained by heat-treating a spherical granulated product of aluminum hydroxide or boehmite (specific surface area thereof is in the above-mentioned range) at about 600° C. for a predetermined period of time or with the spherical granulated product of α-alumina obtained through the heat treatment conducted at a temperature of not lower than 1100° C. for a predetermined period of time.

The heat-treated product obtained through the above step of heat treatment should have a BET specific surface area of not less than a certain degree (e.g., not less than 2 $m^2/g$). Therefore, there is used a spherical granulated product of which the BET specific surface area is adjusted to lie in a suitable range and when the heat treatment is conducted, too, therefore, the reductive nitrogenation is carried out in a state where the spherical granulated product has a suitable degree of gaps.

In the invention, when the spherical granulated product that is once heat-treated is fed to the step of reductive nitrogenation, the granulated product in its dense state is reductively nitrogenated. Therefore, the obtained aluminum nitride powder has very little ruggedness in the surfaces of the particles thereof and offers an advantage of a large strength of the particles. For instance, in case a spherical granulated product of boehmite that easily collapses is used as the starting powder, the strength of the particles is heightened by once conducting the heat treatment as described above to obtain an aluminum nitride powder having a stable particle size distribution.

When the above heat treatment is conducted, however, the specific surface area tends to decrease and the affinity of the resin to the binder tends to decrease, too. That is, upon conducting the heat treatment, the smoothness increases on the surfaces of the particles, and pores in the particles are closed causing a decrease in the specific surface area, a decrease in the affinity and adhesiveness of the resin to the binder.

Therefore, the heat treatment must be conducted to such a degree that the BET specific surface area is maintained to be at least not less than 2 $m^2/g$. Concretely, the heat treatment must be conducted for a suitable period of time depending upon the temperature of the heat treatment so that the BET specific surface area is maintained in the above-mentioned range.

If the heat treatment is so severe that the BET specific surface area decreases to an extreme degree, then the granulated product is less nitrogenated in the step of reductive nitrogenation as described earlier, and the conversion into the aluminum nitride very decreases inviting such an inconvenience as a decrease in the productivity.

3. Step of Reductive Nitrogenation

In the present invention, the spherical granulated product (or a heat-treated product thereof) of the alumina or alumina hydrate is fired (reductively nitrogenated) in a reaction vessel formed by using carbon or a sintered product of aluminum nitride in the presence of a reducing agent (e.g., carbon or a reducing gas) at a predetermined temperature in order to obtain a desired spherical aluminum nitride powder.

In the invention, there is no limitation on the reducing gas used for the reductive nitrogenation if it is reductive. Concretely, there can be used hydrogen, carbon monoxide or ammonia.

Two or more kinds of reducing gases may be used being mixed together and, further, in combination with carbon as described below.

As carbon to be used as a reducing agent, there can be used carbon black, graphite and a carbon precursor that could become a carbon source at high temperatures. As the carbon black, there can be used the carbon black obtained by the furnace method or the channel method, and the acetylene black. There is no special limitation on the particle size of the carbon black. Usually, however, it is desired to use the carbon black having a particle size of 0.01 to 20 μm.

As the carbon precursor, there can be exemplified synthetic resin condensates such as phenol resin, melamine resin, epoxy resin and furanphenol resin; hydrocarbon compounds such as pitch and tar; and organic compounds such as cellulose, sucrose, polyvinylidene chloride and polyphenylene. However, a compound that undergoes the carbonization in the solid phase or via the gaseous phase is preferred. Specifically preferred are synthetic resins such as phenol resin, or a cellulose or a polyphenylene. It is desired that these carbons, too, contain little impurities such as metals.

The nitrogen atmosphere in the reaction vessel is formed by continuously or intermittently feeding the nitrogen gas in an amount by which the spherical granulated product of the alumina or alumina hydrate used as the starting material can be nitrogenated to a sufficient degree.

The reducing gas is desirably fed into the reaction vessel accompanying the nitrogen gas.

The carbon (inclusive of the carbon precursor) used as the reducing agent can be made present in the reaction vessel by a variety of methods. For example, the starting spherical granulated product and the carbon may be made present separately in the reaction vessel, or the spherical granulated product and the carbon may be made present being mixed together in the reaction vessel. Specifically, use of the spherical granulated product and the carbon being mixed together is desired from the standpoint of reliably preventing the particles from coagulating at the time of reductive nitrogenation.

When the carbon is used being mixed into the spherical granulated product, the mixing ratio (spherical granulated product/carbon) is, usually, in a range of 1/0.4 to 1/0.7 (weight ratio). Further, the carbon and the spherical granulated product may be dry-mixed together by using a blender, a mixer or a ball mill under the conditions in which the specific surface area of the spherical granulated product is maintained to lie in a predetermined range.

The reductive nitrogenation (firing) is conducted in the presence of the above-mentioned reducing agent and in the nitrogen atmosphere under the conditions known per se., concretely, at a temperature of 1200 to 1800° C., preferably, 1300 to 1700° C. for about 1 to 20 hours, preferably, about 2 to 10 hours. If the firing temperature is lower than the above temperature range, the nitrogenation reaction does not sufficiently proceed and the desired aluminum nitride powder is not often obtained. If the firing temperature is so high as to exceed the above limit temperature, the nitrogenation reaction proceeds sufficiently permitting, however, oxynitride (AlON) of a low heat conductivity to be formed easily, particles to be easily coagulated and making it difficult to obtain the aluminum nitride powder having the desired particle size.

4. Surface Oxidation Treatment.

In the invention, after the above firing (reductive nitrogenation) has been finished, the surface oxidation treatment can be suitably conducted. The oxidation treatment makes it possible to remove, for example, carbon contained in the powder of aluminum nitride to thereby improve not only the quality but also the water-proof property and, therefore, to effectively prevent the generation of ammonia odor even when the powder is held in an environment containing water content.

Any gas can be used for the oxidation treatment without limitation if it is capable of removing carbon, such as air or oxygen. Air, however, is preferred from the standpoint of economy and the content of oxygen in the obtained aluminum nitride. The treating temperature is, usually, 500 to 900° C. and, preferably, 600 to 750° C. by taking the decarbonization efficiency and the excess of oxidation on the surfaces of aluminum nitride into consideration.

<Spherical Aluminum Nitride Powder>

The present invention makes it possible to obtain a spherical aluminum nitride powder comprising particles having a high degree of sphericalness and relatively large particle sizes as described above.

For example, according to the above-mentioned process as will be understood from an electron microphotograph of FIG. 1, there is obtained a spherical aluminum nitride powder comprising particles of a spherical shape very close to the true sphere having a sphericalness of not less than 0.8 and, specifically, not less than 0.9, and having an average particle size of as relatively large as 10 to 200 μm and, specifically, 20 to 50 μm and a BET specific surface area in a range of 0.5 to 20 $m^2/g$ and, specifically, 0.8 to 17 $m^2/g$ and, further, having particle properties suited for being densely filled in a binder such as resin without impairing formability.

As described earlier, the sphericalness is expressed by the ratio (DS/SL) of the short diameter (DS) and the long diameter (DL) as measured from an electron microphotograph. Further, the average particle size is expressed by the particle size ($D_{50}$) with which the integral volume of the powder dispersed in a suitable solvent is 50% as measured by the laser diffraction/light scattering method.

The greatest feature of the spherical aluminum nitride powder is that the particle strength is very large and an average strength against the crushing (JIS R 1639-5) is in a range of not less than 100 MPa. Namely, as will be understood from FIG. 2 showing the sectional structure of a particle, the particles forming the spherical aluminum nitride powder are solid without forming cavity in the particles and, therefore, exhibit a very large average strength against the crushing.

Therefore, the spherical aluminum nitride powder does not permit particles to be collapsed at the time of being handled, effectively prevents powdering and, further, stably maintains the particle properties, such as sphericalness and average particle size of the particles, and BET specific surface area. For example, when a spherical alumina without gap therein as obtained by being granulated relying on the melt-injection as described above, is used as the starting material, cavities are formed in the particles at the time of reductive nitrogenation, and a large strength against the crushing is not obtained.

Further, the above spherical aluminum nitride powder of the invention has a very large specific surface area as described above yet being solid and having a large strength against the crushing. There has not at all been known any spherical aluminum nitride powder comprising particles having a large strength against the crushing and, at the same time, having such a large specific surface area.

Figure 2:
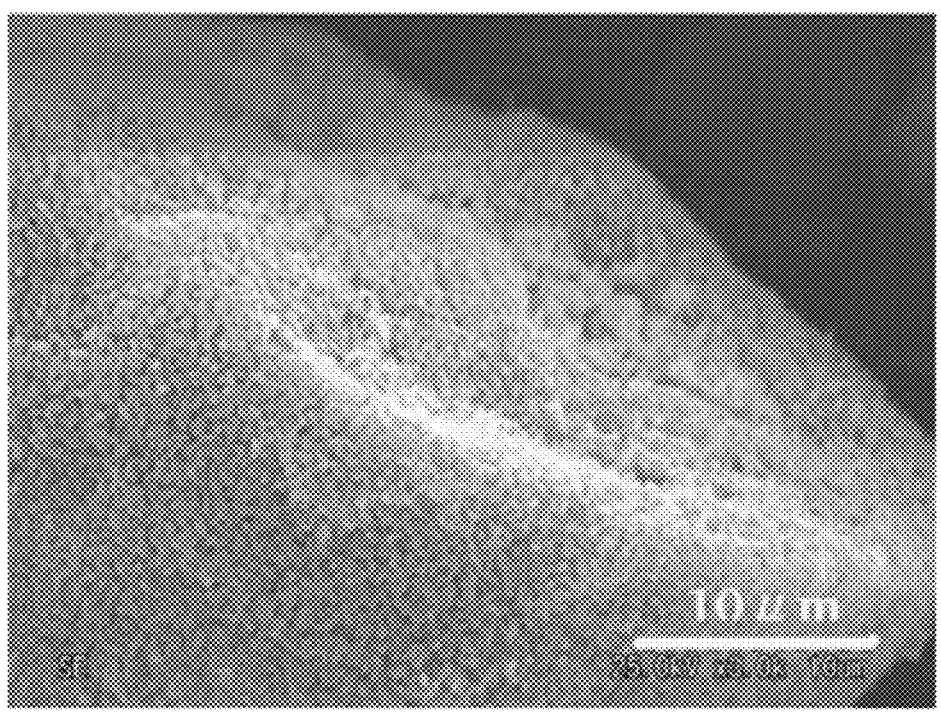
FIG. 2 is an SEM photograph showing a particle structure (cross section) in the representative spherical aluminum nitride powder of the invention.

The spherical aluminum nitride powder of the invention has fine pores in the particles thereof and, as will be learned from FIGS. 1 and 2, has fine ruggedness formed on the particle surfaces stemming from fine pores and is, therefore, considered to possess both a large strength against the crushing and a large specific surface area.

The spherical aluminum nitride powder of the invention having a porous structure that gives a large specific surface area can be confirmed by measuring the distribution of pores by the mercury intrusion porosity method. For example, on a curve of distribution of pores, the abscissa of which representing the diameter of pores and the ordinate of which representing the volume of pores, a singular peak is exhibited at which the volume of pores having pore diameters of 0.1 to 2 μm is a maximum, and it is confirmed that the pores of sizes of more than 2 μm in diameter are present in almost none of the particles. Further, the volume of pores of not more than 2 μm in diameter is in a range of 0.02 to 1.0 $cm^3/g$ and, specifically, 0.1 to 0.5 $cm^3/g$. As will be demonstrated by Comparative Examples appearing later, the above distribution of pores is not found in the spherical aluminum nitride powders obtained by the conventional processes.

In the invention, presence of the above-mentioned pores brings about the effect of improving the adhesiveness of the aluminum nitride powder to the resin. For example, when the aluminum nitride powder is used as a filler for a resin or a grease, the resin or the oil constituting the matrix (binder) enters into the pores to exhibit anchoring effect, contributing to improving the adhesion between the matrix and the filler (AlN powder) and imparting highly heat conducting property to the matrix. When the matrix is a resin, in particular, the strength of the formed body thereof can be improved, too.

The AlN powder of the invention can be highly converted into the aluminum nitride (hereinafter called AlN conversion) as compared to the known aluminum nitrides obtained by reductively nitrogenating the alumina, and has an AlN conversion of, for example, not less than 50%, preferably, not less than 60% and, more preferably, not less than 70%, and features a very high heat conductivity.

The AlN conversion is a conversion of the alumina into the aluminum nitride, and is found from a ratio of peak intensities of the aluminum nitride and the alumina in the X-ray diffraction as will be described later.

There is no particular limitation concerning impurities such as cations in the spherical aluminum nitride powder of the invention. However, the aluminum nitride powder has been produced without using flux agent and, therefore, contains cations in very small amounts, for example, in amounts of not more than 0.3% by weight and, specifically, not more than 0.2% by weight.

The spherical aluminum nitride powder of the invention can be widely used as a filler for heat-radiating materials in various applications in which the properties of the aluminum nitride can be utilized, such as heat-radiating sheet, heat-radiating grease, heat-radiating adhesive, coating material and heat-conducting resin.

As the resin or grease that serves as the matrix of the heat-radiating material, there can be exemplified thermosetting resins such as epoxy resin and phenol resin; thermoplastic resins such as polyethylene, polypropylene, polyamide, polycarbonate, polyimide and polyphenylene sulfide; rubbers such as silicone rubber, EPR and SBR; and silicone oil. The heat-radiating material is added desirably in an amount of 150 to 1000 parts by weight per 100 parts by weight of the resin or grease.

As the heat-radiating material, there can be used one or several kinds of fillers such as alumina, boron nitride, zinc oxide, silicon carbide and graphite in addition to the spherical aluminum nitride powder of the invention. These fillers may be those of which the surfaces are treated, for example, with a silane-coupling agent, phosphoric acid or phosphate. The shape and particle size of the spherical aluminum nitride powder of the invention and of other fillers may be selected depending upon the properties and use of the heat-radiating material. Further, the ratio of mixing the spherical aluminum nitride powder and other fillers in the heat-radiating material can be suitably adjusted in a range of 1:99 to 99:1.

Further, additives such as plasticizer, vulcanizer, curing promoter and parting agent may be added to the heat-radiating material.

EXAMPLES

The invention will now be concretely described, but it should be noted that the invention is in no way limited to the following Examples only. In Examples and Comparative Examples, properties were measured according to the methods described below.

(1) Specific Surface Area.

The specific surface area was measured according to the BET single point method.

(2) Average Particle Size of a Spherical Granulated Product of Alumina Powder or Alumina Hydrate Powder.

By using a shaking/sieving machine (manufactured by Tanaka Kagaku Kikai Co.) and by setting the sieves (JIS Z8801) of meshes of 90, 75, 63, 53, 45, 38, 32 and 22 μm, 20 g of the sample (granulated product of alumina or alumina hydrate) was introduced therein and shook for 7 minutes. Thereafter, the weight of the sample was measured on each sieve to find a particle size ($D_{50}$) with which the integral amount of the particles remaining on the sieves was 50% by weight.

(3) Average Particle Sizes of Alumina Powder (Ungranulated Material) and AlN Powder.

By using a homogenizer, the sample was dispersed in an aqueous solution containing 5% of sodium pyrophosphate to measure an average particle size ($D_{50}$) with which the integral volume thereof was 50% by using a laser diffraction particle size distribution measuring apparatus (MICROTRAC HRA manufactured by Nikkiso Co.).

(4) AlN Conversion.

Relying upon the X-ray diffraction (CuKα, 10 to 70°) and upon the calibration curve method, there were found peak intensities of a major peak of the aluminum nitride (AlN) (peak stemming from the plane (100)) and major peaks of the alumina components (α-alumina, φ-alumina, γ-alumina, δ-alumina) to calculate an AlN conversion from the peak intensities in compliance with the following formula (1).

When other components were contained, major peaks of such components were selected and were added to the denominator of the formula (1).

$$\text{AlN conversion (\%)} = (Q/R) \times 100 \quad (1)$$

Wherein,
Q is a peak intensity of the AlN, and
R is the sum of the peak intensity of the AlN and peak intensities of the alumina and other components.
Major peaks of the alumina components.

α-alumina: peak stemming from the plane (113)
γ-alumina: peak stemming from the plane (400)
φ-alumina: peak stemming from the plane (403)
δ-alumina: peak stemming from the plane (046)

(5) Sphericalness:

A hundred particles were arbitrarily selected from an image of an electron microphotograph, long diameters (DL) and short diameters (DS) of the images of particles were measured by using a scale, and an average value of the ratios (DS/DL) thereof was regarded to be the sphericalness.

(6) Contents of Cationic Impurities.

The aluminum nitride powder was melted with an alkali and was neutralized with an acid, and the contents of cationic impurities (concentrations of metal elements) were determined by the ICP emission spectroscopy of the solution by using the ICP-1000 manufactured by Shimazu Mfg. Co.

(7) Average Strength Against the Crushing.

The average strength against the crushing of the AlN powder was found relying upon the compression test of monotonous particles (JIS R1639-5). By using a micro-compression tester (MTC-W manufactured by Shimazu Mfg. Co.), a hundred arbitrarily selected particles were individually compressed to find the strength against the crushing from the crushing force and the particle size to thereby obtain an arithmetic mean value thereof.

(8) Distribution of Pore Sizes.

By using a pore size distribution measuring apparatus (Autopore IV9510 manufactured by Micromellitics Co.), the distribution of pore sizes of the AlN powder was found relying on the mercury intrusion porosity method.

(9) Heat Conductivity of the Silicone Rubber Sheet.

A heat conducting silicone rubber composition blended with the AlN powder was formed into a size of 10 cm×6 cm and 3 mm thick, and was cured by being heated in an oven of the hot air circulation type maintained at 150° C. for one hour, and the heat conductivity of the AlN powder was measured by using a heat conductivity measuring instrument (QTM-500 manufactured by Kyoto Denshi Kogyo Co.). In order to prevent the leakage of current through the portion being detected, the measurement was taken through a polyvinylidene chloride film of a thickness of 10 μm.

(10) Method of Evaluating the Hardness of the Silicone Rubber Sheet.

The heat conducting silicone rubber composition blended with the AlN powder was heated in the oven of the hot air circulation type maintained at 150° C. for one hour to obtain a heat conducting silicone rubber sheet which was then measured for its hardness by using a durometer hardness tester in compliance with the JIS K6253.

(11) Tensile Strength.

The above heat conducting silicone rubber sheet was subjected to the tensile test in compliance with the JIS K6301 to measure the tensile strength at breakage. The larger the tensile strength, the greater the adhesiveness between the AlN powder and the matrix.

Example 1

As a granulated product of the alumina hydrate powder for use as the starting material, the following granulated product of boehmite was provided.

Granulated Product of Boehmite:
Average particle size ($D_{50}$) by the sieving method: 40 μm
BET specific surface area: 135 m²/g
Sphericalness: 0.98

280 Grams of the above granulated product of boehmite and 140 g of carbon black were mixed together. Next, the mixed powder was introduced into a container made of carbon, reductively nitrogenated therein at 1600° C. for 3 hours while flowing nitrogen and was, thereafter, oxidized at 680° C. for 8 hours while flowing the air to obtain an AlN powder.

Figure 3:
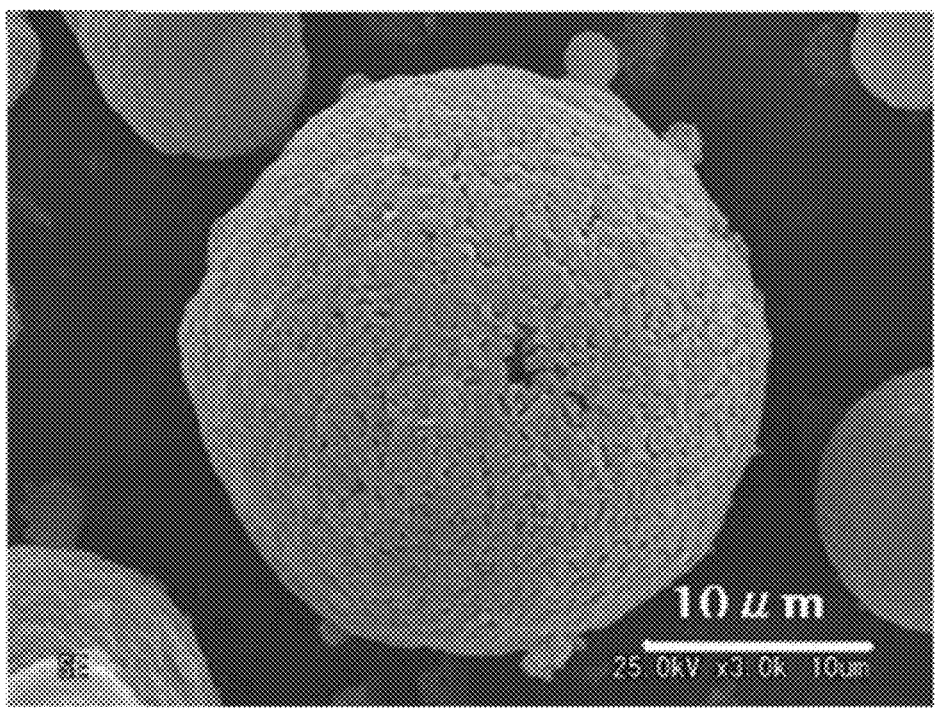
FIG. 3 is an SEM photograph showing a particle structure in a spherical aluminum nitride powder obtained in Example 1.

The obtained AlN powder was measured for its average particle size, specific surface area, AlN conversion, sphericalness, strength against the crushing and pore size distribution according to the methods described above to obtain the results as shown in Table 1. FIG. 3 is an SEM photograph of the obtained AlN powder.

As the silicone rubber, further, there was provided the micellable type silicone (TSE 201 manufactured by Momentive Performance Materials Japan Joint Co.).

450 Parts by weight of the AlN powder obtained above, 100 parts by weight of the silicone rubber, and 0.5 parts by weight of a parting agent were kneaded together in a pressurized kneader. Next, the kneaded product was cooled. Thereafter, by using a roll, 0.5 parts by weight of a crosslinking agent was, further, mixed thereto, and the mixture was pressed at 180° C. for 15 minutes to obtain a sheet 10 cm long, 6 cm wide and 3 mm thick.

The obtained sheet was measured for its heat conductivity, hardness and tensile strength according to the methods described above to obtain the results as shown in Table 1.

Example 2

An AlN powder was obtained in the same manner as in Example 1 but conducting the nitrogenation under the conditions of 1400° C. for 30 hours.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 4:
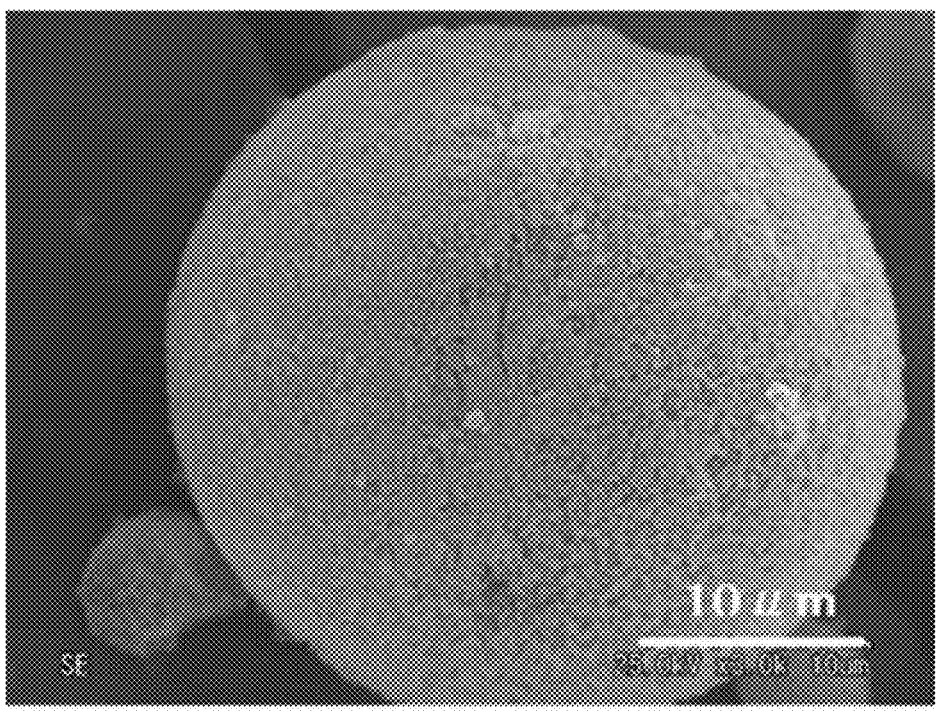
FIG. 4 is an SEM photograph showing a particle structure in a spherical aluminum nitride powder obtained in Example 2.

FIG. 4 is an SEM photograph of the obtained AlN powder.

Example 3

An AlN powder was obtained in the same manner as in Example 1 but conducting the nitrogenation under the conditions of 1650° C. for 15 hours.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 5:
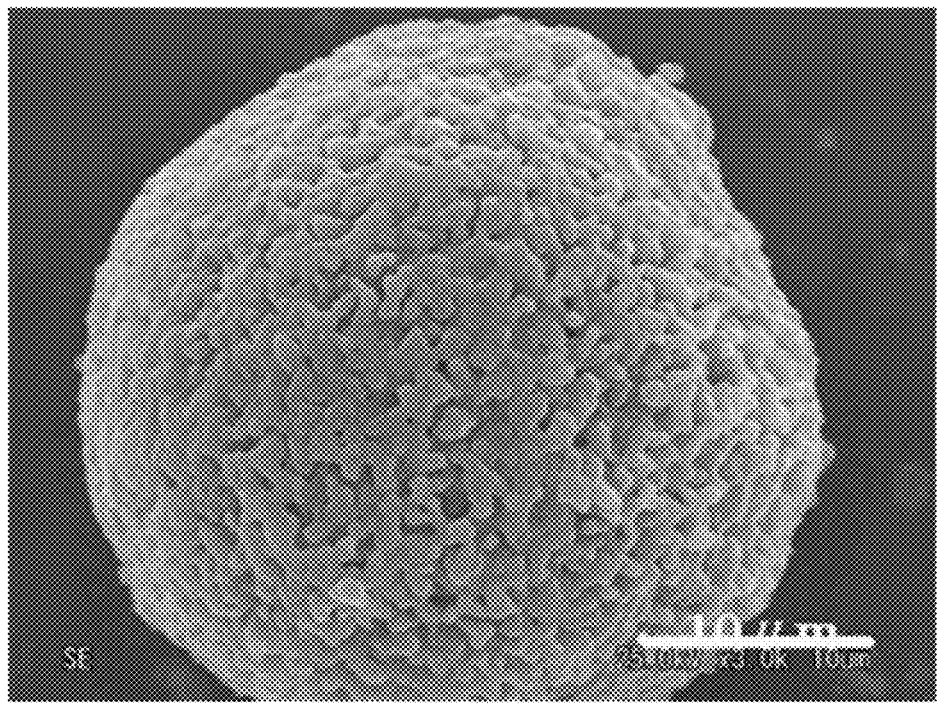
FIG. 5 is an SEM photograph showing a particle structure in a spherical aluminum nitride powder obtained in Example 3.

FIG. 5 is an SEM photograph of the obtained AlN powder.

Example 4

As a granulated product of the alumina hydrate powder for use as the starting material, the following granulated product of γ-alumina was provided.
Granulated Product of γ-Alumina:
  Average particle size ($D_{50}$) by the sieving method: 38 μm
  BET specific surface area: 152 m$^2$/g
  Sphericalness: 0.98
An AlN powder was obtained in the same manner as in Example 1 but using the granulated product of the above γ-alumina as the starting material.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 6:
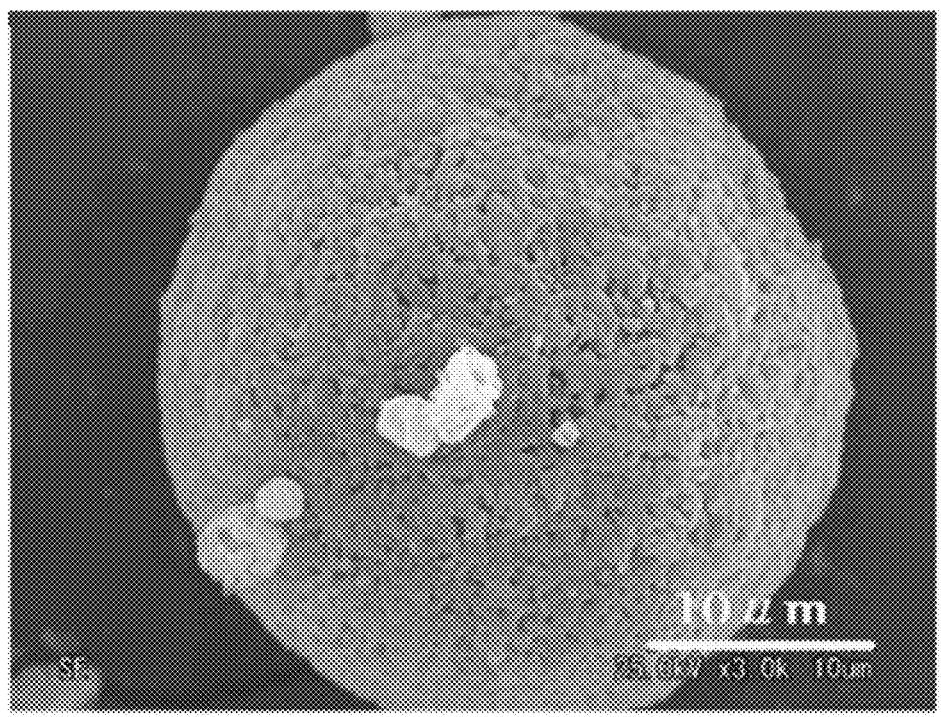
FIG. 6 is an SEM photograph showing a particle structure in a spherical aluminum nitride powder obtained in Example 4.

FIG. 6 is an SEM photograph of the obtained AlN powder.

Example 5

As a granulated product of the alumina hydrate powder for use as the starting material, the following granulated product of boehmite was provided.
Granulated Product of Boehmite:
  Average particle size ($D_{50}$) by the sieving method: 20 μm
  BET specific surface area: 51 m$^2$/g
  Sphericalness: 0.98
An AlN powder was obtained in the same manner as in Example 1 but using the above granulated product of boehmite as the starting material and conducting the nitrogenation under the conditions of 1650° C. for 3 hours.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 7:
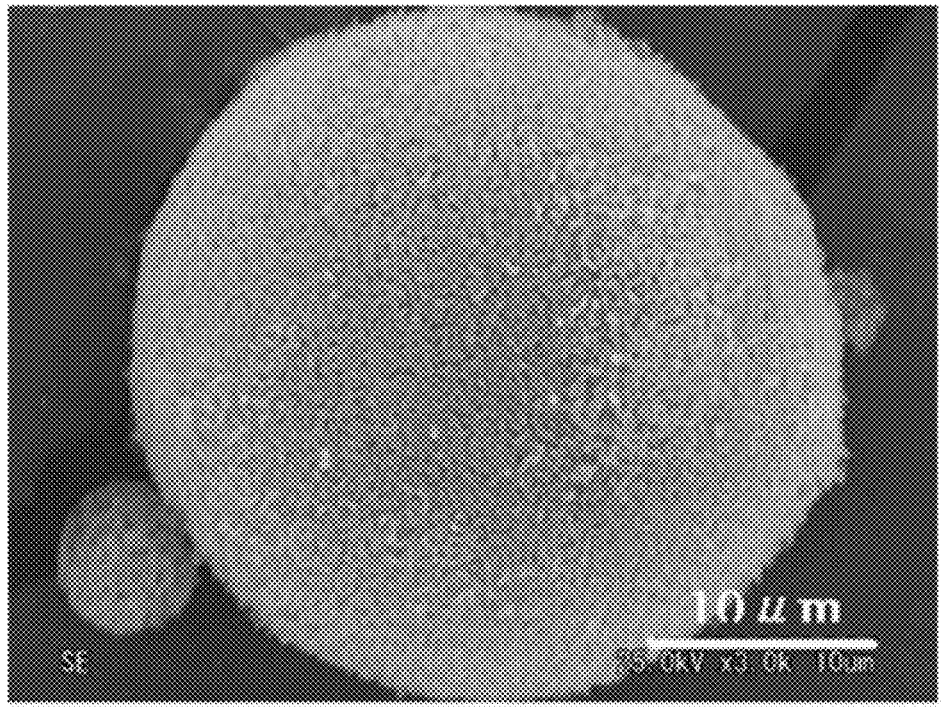
FIG. 7 is an SEM photograph showing a particle structure in a spherical aluminum nitride powder obtained in Example 5.

FIG. 7 is an SEM photograph of the obtained AlN powder.

Example 6

As a granulated product of the alumina powder for use as the starting material, the following granulated product of γ-alumina was provided.
Granulated Product of γ-Alumina:
  Average particle size ($D_{50}$) by the sieving method: 19 μm
  BET specific surface area: 49 m$^2$/g
  Sphericalness: 0.97
An AlN powder was obtained in the same manner as in Example 1 but using the above granulated product of γ-alumina as the starting material and conducting the nitrogenation under the conditions of 1650° C. for 3 hours.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 8:
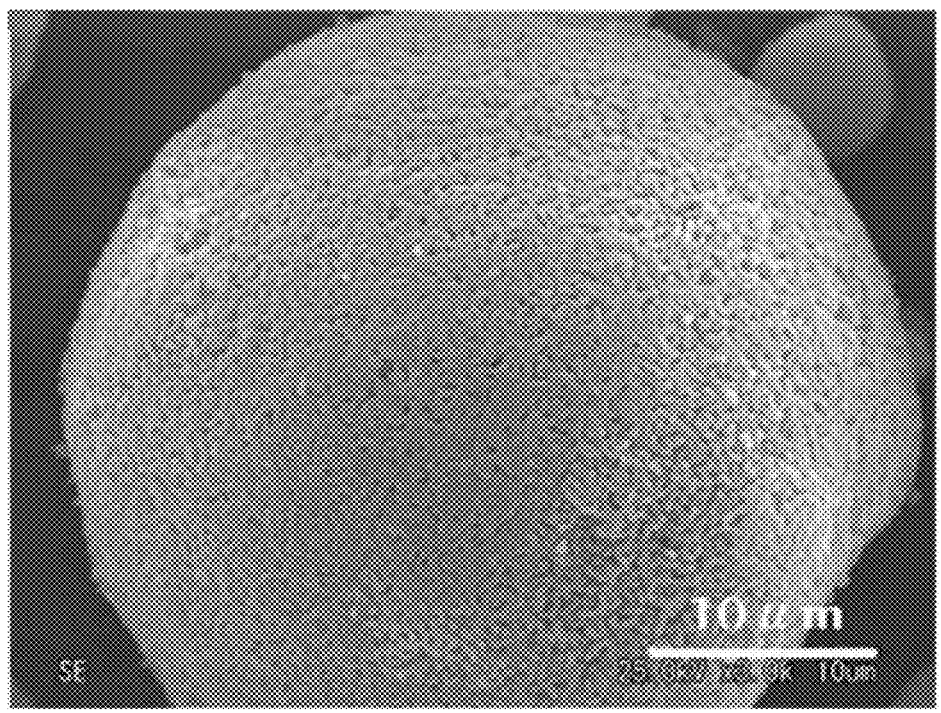
FIG. 8 is an SEM photograph showing a particle structure in a spherical aluminum nitride powder obtained in Example 6.

FIG. 8 is an SEM photograph of the obtained AlN powder.

Example 7

The granulated product of boehmite used in Example 1 was heat-treated at 1200° C. for 5 hours while flowing the air so as to be converted into the α-alumina. The granular α-alumina (heat-treated product of boehmite) possessed the following properties.
Granular α-Alumina (Heat-Treated Product of Boehimite):
  Average particle size ($D_{50}$) by the sieving method: 25 μm
  BET specific surface area: 10.7 m$^2$/g
  Sphericalness: 0.95
The above granular α-alumina was reductively nitrogenated in the same manner as in Example 1 to obtain an AlN powder.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 9:
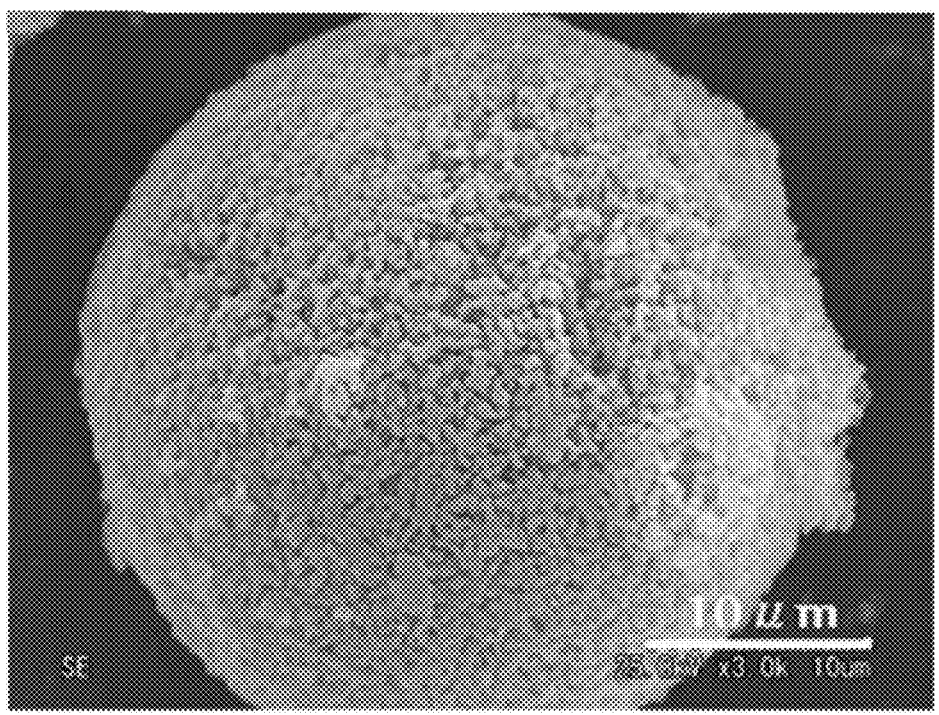
FIG. 9 is an SEM photograph showing a particle structure in a spherical aluminum nitride powder obtained in Example 7.

FIG. 9 is an SEM photograph of the obtained AlN powder.

Example 8

The granulated product of γ-alumina used in Example 6 was heat-treated at 1200° C. for 5 hours while flowing the air so as to be converted into the α-alumina. The granular α-alumina (heat-treated product of γ-alumina) possessed the following properties.
Granulated Product of α-Alumina:
  Average particle size ($D_{50}$) by the sieving method: 19 μm
  BET specific surface area: 4.8 m²/g
  Sphericalness: 0.95
An AlN powder was obtained in the same manner as in Example 1 but using the above granulated product of α-alumina.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 1.

Figure 10:
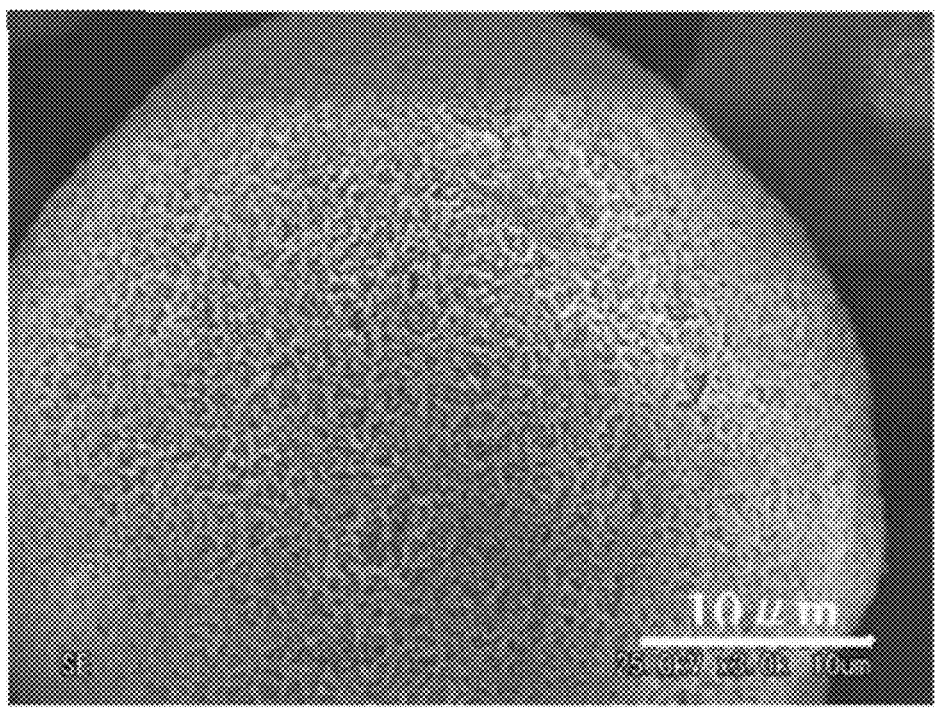
FIG. 10 is an SEM photograph showing a particle structure in a spherical aluminum nitride powder obtained in Example 8.

FIG. 10 is an SEM photograph of the obtained AlN powder.

Comparative Example 1

An α-alumina powder having the following particle properties was provided.
α-Alumina Powder (Ungranulated Product).
  Average particle size ($D_{50}$) by the laser diffraction/light scattering method: 1.2 μm
  BET specific surface area: 9.5 m²/g
  Sphericalness: 0.65
280 Grams of the above α-alumina powder and 140 g of carbon black were mixed together. Next, the mixed powder was introduced into a container made of carbon, reductively nitrogenated therein at 1600° C. for 3 hours while flowing nitrogen and was, thereafter, oxidized at 680° C. for 8 hours while flowing the air to obtain an AlN powder.

To 100 parts by weight of the obtained AlN powder, there were added 5 parts by weight of yttria, 100 parts by weight of a toluene solvent, 5 parts by weight of a butyl methacrylate and 2 parts by weight of a hexaglycerin monooleate, followed by mixing in a ball mill for 5 hours. The obtained slurry was then spray-dried to obtain a granulated product of a spherical aluminum nitride powder having an average particle size of 22 μm. The spray-drying was conducted under the following conditions.

Spray-Drying Conditions:
  Inlet temperature: 100° C.
  Outlet temperature: 80° C.
  Atomizer rotational speed: 13000 rpm
The obtained spherical AlN granulated product was introduced into a container made of boron nitride, and fired therein at 1750° C. for 5 hours while flowing nitrogen to obtain a spherical AlN powder.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 2.

Figure 11:
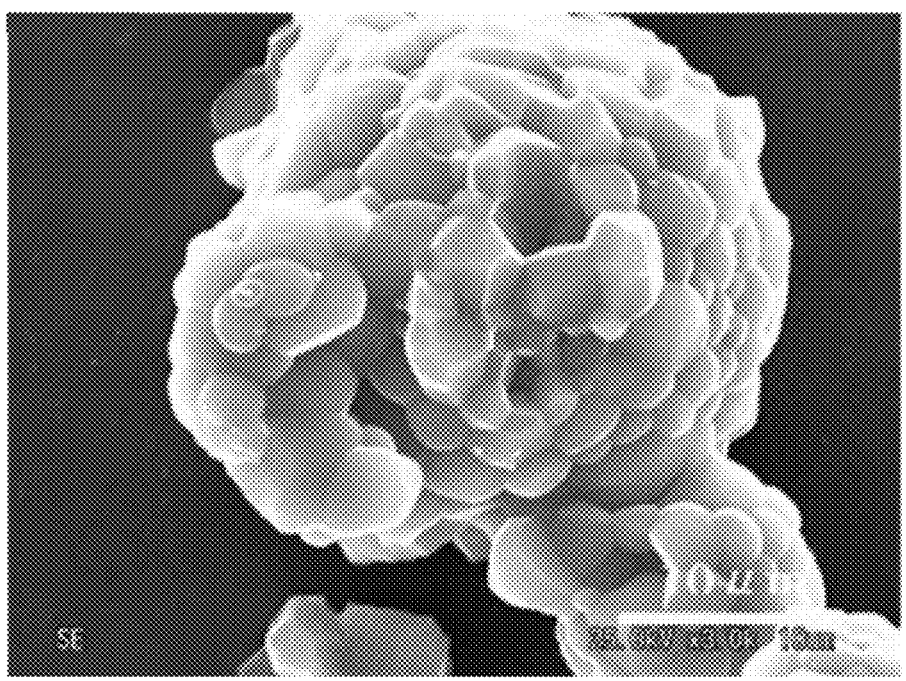
FIG. 11 is an SEM photograph showing a particle structure in a spherical aluminum nitride powder obtained in Comparative Example 1.

FIG. 11 is an SEM photograph of the obtained AlN powder.

Comparative Example 2

A spherical AlN powder was obtained in the same manner as in Comparative Example 1 but changing the conditions for spray-drying the slurry as follows:
Spray-Drying Conditions:
  Inlet temperature: 100° C.
  Outlet temperature: 80° C.
  Atomizer rotational speed: 6000 rpm
The obtained AlN powder was measured for its average particle size, specific surface area, AlN conversion, sphericalness, strength against the crushing and pore size distribution. Further, a silicone rubber sheet blended with the AlN powder was measured for its heat conductivity, hardness and tensile strength in the same manner as in Example 1. The results were as shown in Table 2.

Figure 12:
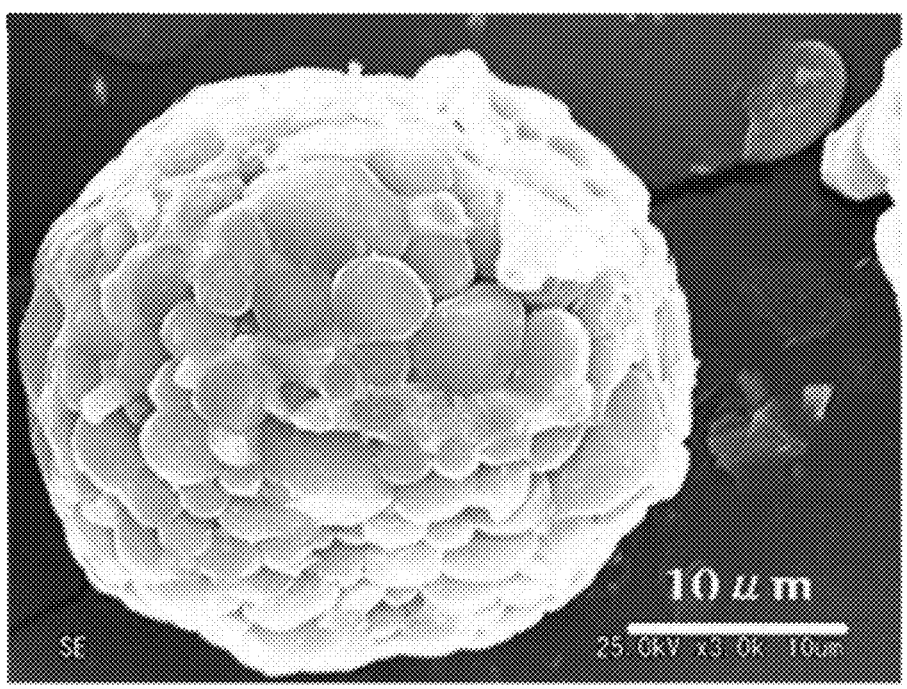
FIG. 12 is an SEM photograph showing a particle structure in a spherical aluminum nitride powder obtained in Comparative Example 2

FIG. 12 is an SEM photograph of the obtained AlN powder.

Comparative Example 3

As the starting material, there was provided a spherical alumina having the following particle properties obtained by the melt-injection method.
Spherical Alumina (Ungranulated Product) Obtained by the Melt-Injection Method:
  Average particle size ($D_{50}$) by the laser diffraction/light scattering method: 16 μm
  BET specific surface area: 0.17 m²/g
  Sphericalness: 0.98
An AlN powder was obtained in the same manner as in Example 1 but using the above spherical alumina.

The obtained AlN powder was measured for its average particle size, specific surface area, AlN conversion, sphericalness, strength against the crushing and pore size distribution in the same manner as in Example 1. Further, a silicone rubber sheet blended with the AlN powder was measured for its heat conductivity, hardness and tensile strength in the same manner as in Example 1. The results were as shown in Table 2.

Figure 13:
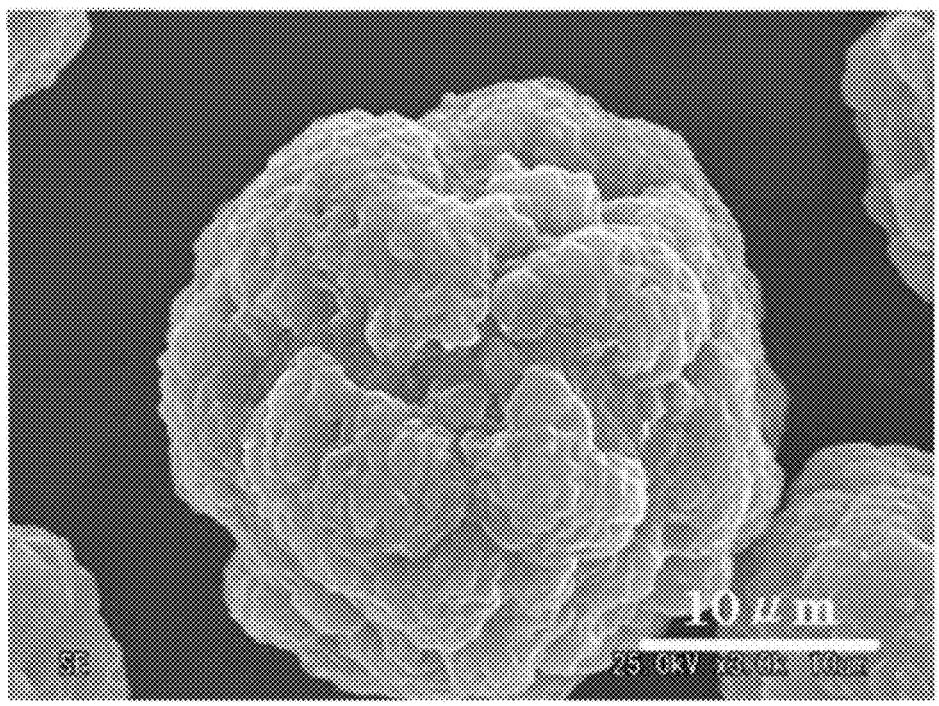
FIG. 13 is an SEM photograph showing a particle structure in a spherical aluminum nitride powder obtained in Comparative Example 3.

FIG. 13 is an SEM photograph of the obtained AlN powder.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| AlN powder | | | | | | | | |
| Average Particle size [μm] | 41 | 39 | 47 | 44 | 22 | 23 | 46 | 22 |
| BET specific surface area [m²/g] | 3.2 | 3.0 | 0.85 | 2.7 | 4.6 | 3.9 | 3.8 | 5.1 |
| Total volume of pores of diameters of smaller than 2 μm [cm³/g] | 0.26 | 0.23 | 0.12 | 0.17 | 0.22 | 0.19 | 0.18 | 0.21 |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Conversion into aluminum nitride [%] | 56 | 52 | 86 | 76 | 68 | 82 | 100 | 99 |
| Ave. strength against the crushing [MPa] | 143 | 158 | 106 | 133 | 162 | 157 | 115 | 121 |
| Sphericalness | 0.98 | 0.99 | 0.92 | 0.97 | 0.98 | 0.94 | 0.92 | 0.93 |
| Contents of impurities | | | | | | | | |
| Ca [ppm] | 28 | 26 | 31 | 25 | 9 | 15 | 24 | 10 |
| Si [ppm] | 93 | 82 | 90 | 76 | 58 | 62 | 77 | 37 |
| Fe [ppm] | 35 | 33 | 29 | 43 | 45 | 38 | 37 | 7 |
| Sheet | | | | | | | | |
| Heat conductivity [W/m·K] | 1.6 | 1.4 | 2.6 | 2.0 | 1.8 | 2.7 | 2.9 | 2.8 |
| Hardness [durometer A] | 76 | 74 | 73 | 75 | 77 | 71 | 74 | 73 |
| Tensile strength [MPa] | 10 | 12 | 10 | 11 | 13 | 10 | 11 | 12 |
| Remarks (starting material) | *1 | *1 | *1 | *2 | *1 | *2 | *1 | *3 |

*1: granulated product of boehmite
*2: granulated product of γ-alumina
*3: granulated product of α-alumina

TABLE 2

|  | Comp. Ex. 1 | Comp. Ex. 2 | Comp. Ex. 3 |
|---|---|---|---|
| AlN powder | | | |
| Average Particle size [μm] | 20 | 52 | 23 |
| BET specific surface area [$m^2$/g] | 0.30 | 0.17 | 0.39 |
| Total volume of pores of diameters of smaller than 2 μm [$cm^3$/g] | <0.01 | <0.01 | <0.01 |
| Conversion into aluminum nitride [%] | 100 | 100 | 75 |
| Ave. strength against the crushing [MPa] | 258 | 271 | 75 |
| Sphericalness | 0.74 | 0.85 | 0.89 |
| Contents of impurities | | | |
| Ca [ppm] | 120 | 107 | 42 |
| Si [ppm] | 33 | 25 | 24 |
| Fe [ppm] | 15 | 13 | 56 |
| Sheet | | | |
| Heat conductivity [W/m·K] | 2.6 | 2.4 | 1.2 |
| Hardness [durometer A] | 84 | 76 | 78 |
| Tensile strength [MPa] | 8 | 7 | 6 |
| Remarks (starting material) | *1 | *1 | *2 |

*1: AlN sintered powder
*2: melt-injected α-alumina

The invention claimed is:

1. A process for producing a spherical aluminum nitride powder by using a spherical granulated product of an alumina powder or an alumina hydrate powder as a starting material, and feeding said spherical granulated product to the step of reductive nitrogenation so as to be reductively nitrogenated;
   wherein said spherical granulated product of said alumina powder or said alumina hydrate powder has a BET specific surface area of 30 to 500 $m^2$/g;
   further including the step of heat treatment for once heat-treating said spherical granulated product to lower the BET specific surface area of said spherical granulated product prior to conducting said step of reductive nitrogenation;
   wherein said heat treatment is conducted to such a degree that the BET specific surface area is lowered but is maintained to be at least not less than 2 $m^2$/g.

2. The process for production according to claim 1, wherein said spherical granulated product is the one obtained by spray-drying said alumina powder or said alumina hydrate powder.

3. The process for production according to claim 1, wherein in said step of reductive nitrogenation, said spherical granulated product or the heat-treated product thereof is reductively nitrogenated in a nitrogen atmosphere in the presence of a reducing agent at a temperature of 1200 to 1800° C.

4. The process for production according to claim 1, wherein the obtained spherical aluminum nitride powder comprises particles having a sphericalness of not less than 0.8 on the average, a strength against crushing of not less than 100 MPa, an average particle size ($D_{50}$) in a range of 10 to 200 μm, a BET specific surface area in a range of 0.5 to 20 $m^2$/g, and a conversion into AlN of not less than 99%.

* * * * *